United States Patent

Craft

[11] Patent Number: 5,836,206
[45] Date of Patent: Nov. 17, 1998

[54] VEHICLE TRANSMISSION AND THRUST WASHER THEREFOR

[75] Inventor: Robert Craft, Ceresco, Mich.

[73] Assignee: Eaton Corporation, Cleveland, Ohio

[21] Appl. No.: 730,950

[22] Filed: Nov. 12, 1996

[51] Int. Cl.$^6$ .............................. F16H 3/097; F16H 57/04
[52] U.S. Cl. ................................................ 74/333; 74/331
[58] Field of Search ........................... 74/325, 333, 331; 411/161, 534; 384/368

[56] References Cited

U.S. PATENT DOCUMENTS

| | | | |
|---|---|---|---|
| 2,096,304 | 10/1937 | Lapsley | 74/333 |
| 2,397,905 | 4/1946 | Acton et al. | 308/135 |
| 3,293,931 | 12/1966 | Beattie | 74/325 |
| 3,894,621 | 7/1975 | Quick | 192/109 R |
| 4,034,620 | 7/1977 | McNamara et al. | 74/410 |
| 4,423,643 | 1/1984 | McNamara | 74/331 |
| 4,485,681 | 12/1984 | Olmstead, Jr. et al. | 74/331 |
| 4,669,326 | 6/1987 | Kawamoto | 74/325 |
| 5,179,866 | 1/1993 | Reynolds et al. | 74/332 |
| 5,269,194 | 12/1993 | Reynolds | 74/333 |
| 5,383,543 | 1/1995 | Craft | 192/48.8 |
| 5,624,343 | 4/1997 | Krisher | 411/534 |

*Primary Examiner*—Charles A. Marmor
*Assistant Examiner*—Sherry Lynn Estremsky
*Attorney, Agent, or Firm*—Albert E. Chrow; Howard D. Gordon

[57] ABSTRACT

An improved vehicular change gear transmission (100) is provided that includes a mainshaft thrust washer (32) having at least one and preferably a plurality of substantially equally circumferentially spaced depressions (48) on at least one side and preferably indexed with substantially equally circumferentially spaced depressions (58) on the opposite side thereof that are adapted to enable lubricant (9) to move radially outwardly from between mainshaft gear thrust surfaces (47, 49) disposed on opposite sides of thrust washer (32) to minimize accumulation of lubricant (9) therebetween resulting in reduced hydrodynamic drag.

5 Claims, 3 Drawing Sheets

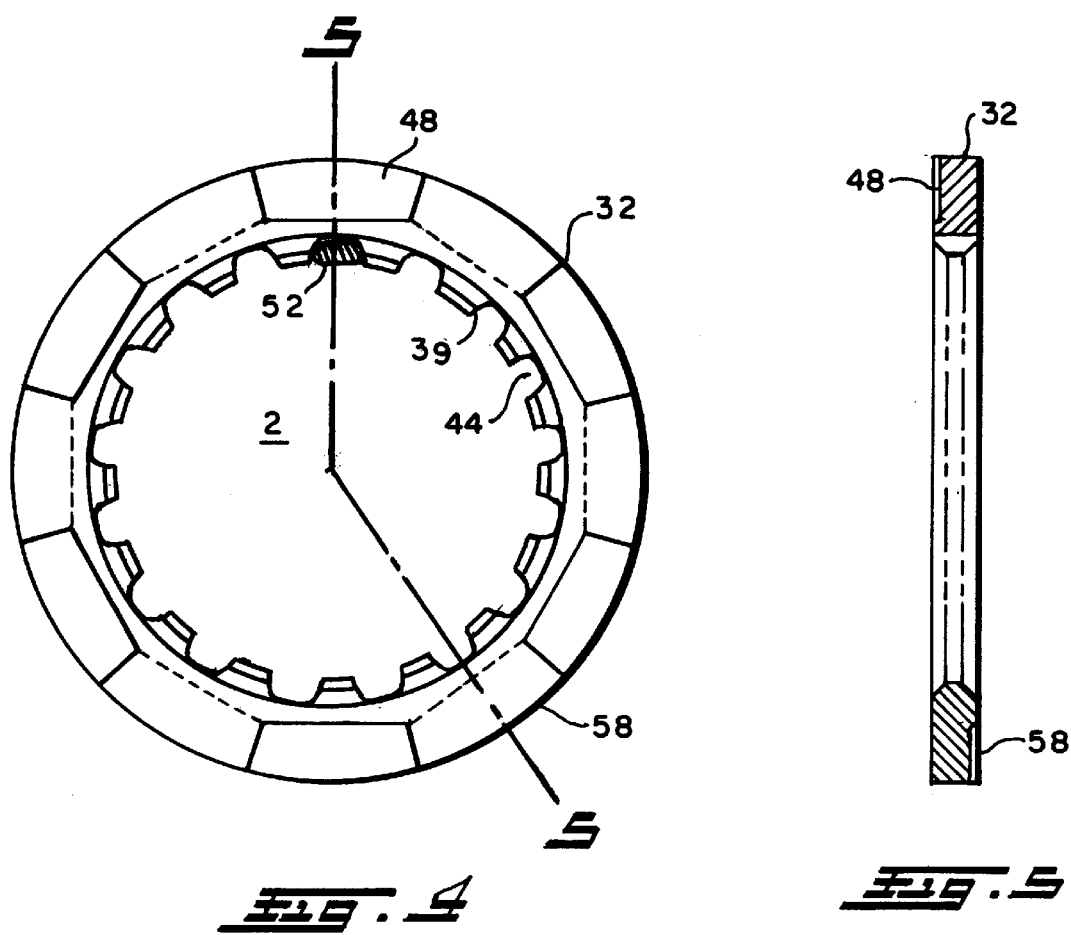

VEHICLE TRANSMISSION AND THRUST WASHER THEREFOR

INTRODUCTION

This invention relates generally to an improved thrust washer operative to transmit axial thrust to the mainshaft of a vehicular change gear transmission that has been imparted to a floating mainshaft gear during the process of clutchingly engaging the gear to the mainshaft for rotation therewith and more particularly to an improved washer that includes at least one depression disposed on at least one side thereof facing towards an annular thrust surface on the change gear that is operative to enable lubricant to move radially outwardly from between the mainshaft gear thrust surface and the thrust washer so as to diminish accumulation of lubricant therebetween.

BACKGROUND OF THE INVENTION

Transmissions featuring floating transmission mainshaft gears such as associated with twin countershaft transmission are well known and examples of which can be found in U.S. Pat. Nos. 3,237,472; 3,238,613; 3,425,290; and 3,885,446, the disclosures of which are incorporated herein by reference.

Such transmissions generally feature a plurality of floating mainshaft gears that encircle the mainshaft and are supported and driven by countershaft gears, typically two countershaft gears, that are mounted on a pair of countershafts disposed on opposite sides of the mainshaft.

The mainshaft gears are characteristically clutched to the mainshaft by means of a clutch mechanism that slides along external splines extending axially along the mainshaft and has radially inwardly extending teeth or splines that engage internal teeth or splines on the mainshaft gear so as to cause rotation of the mainshaft when the mainshaft gear is clutched thereto.

A problem long ago recognized has been the potential for transfer of axial thrust to a floating mainshaft gear being clutched to a mainshaft by an axially moving clutch assembly. In view of such, a variety of solutions have been devised over past years for transmitting axial thrust to the mainshaft that has been imparted to a mainshaft gear by an axially moving clutch assembly rather than a mainshaft gear adjacent to the gear being clutched to the mainshaft.

Such solutions have generally been in form of gear retainer(s) of one type of another that characteristically limit axial movement of the mainshaft gears to prevent them from engaging each other whether or not one of them is being clutched to the mainshaft.

One example of retainer assembly for limiting axial movement of a transmission gear is disclosed in U.S. Pat. No. 2,397,905, the disclosure of which is incorporated herein by reference. Here however, a costly and expensive pivotal woodruff key is required to lock a thrust collar onto external splines of the mainshaft to prevent a gear from moving axially.

An example of a splined thrust washer for transmitting axial thrust from a gear set to a propeller drive shaft is disclosed in U.S. Pat. No. 3,894,621, the disclosure of which is incorporated herein by reference. Here, a splined thrust washer (52) is slid along the shaft splines to a transverse groove adjacent a stepped shoulder on the shaft and is held in place against the shoulder by a splined collar (30). Thrust washer (52) is operative to transmit axial thrust of only one gear to the propeller shaft and in addition to requiring the use of Collar (30), also requires costly and complex machining of a stepped configuration to the Propeller shaft exterior.

A more recent example of a transmission mainshaft gear retainer for preventing axial movement of two closely spaced gears to prevent transfer of axial thrust force therebetween is disclosed in U.S. Pat. No. 4,034,620, the disclosure of which is incorporated herein by reference. Here a thrust ring (104) is splined to the mainshaft between two adjacent gears and is held in place by means of snap rings (108, 110) on opposite sides thereof. The gears are further required to have costly and complex mating tongue and groove configurations that operate in conjunction with an additional snap ring (102) to limit movement of the gears away from each other.

Yet more recent examples of transmission thrust washers are disclosed in U.S. Pat. Nos. 5,269,194 and 5,383,543, assigned to the assignee of the present invention and the disclosures of which are incorporated herein by reference.

However, a problem exists with the use of such thrust washers in that lubricant used to lubricate the mainshaft and mainshaft and countershaft gears becomes trapped between the thrust washer and the mainshaft gear thrust surface and forms a hydrodynamic lubricant layer that creates a drag, tending to lock the thrust washer and the mainshaft gear together.

It has been discovered that the accumulation of lubricant between the thrust washer and the mainshaft gear thrust surface is diminished by inclusion of at least one depression on at least one side of the thrust washer that is operative to enable the lubricant to move radially outwardly from the space therebetween.

SUMMARY OF THE INVENTION

Accordingly, it is one object of this invention to provide a vehicular change gear transmission having means for diminishing accumulation of lubricant between a mainshaft change gear and a thrust washer forming a part thereof.

It is another object of this invention to provide an improved thrust washer for a vehicular change gear transmission having at least one depression therein operative to diminish accumulation of lubricant between the thrust washer and a mainshaft gear forming a part thereof.

BRIEF DESCRIPTION OF THE DRAWINGS

FIG. 4 is a side elevation view of thrust washer 32 of the invention disposed about mainshaft 2; and FIG. 5 is an edge view of thrust washer 32 taken along view line 5—5 in FIG. 4.

DESCRIPTION OF SOME PREFERRED EMBODIMENTS

Figure 1:
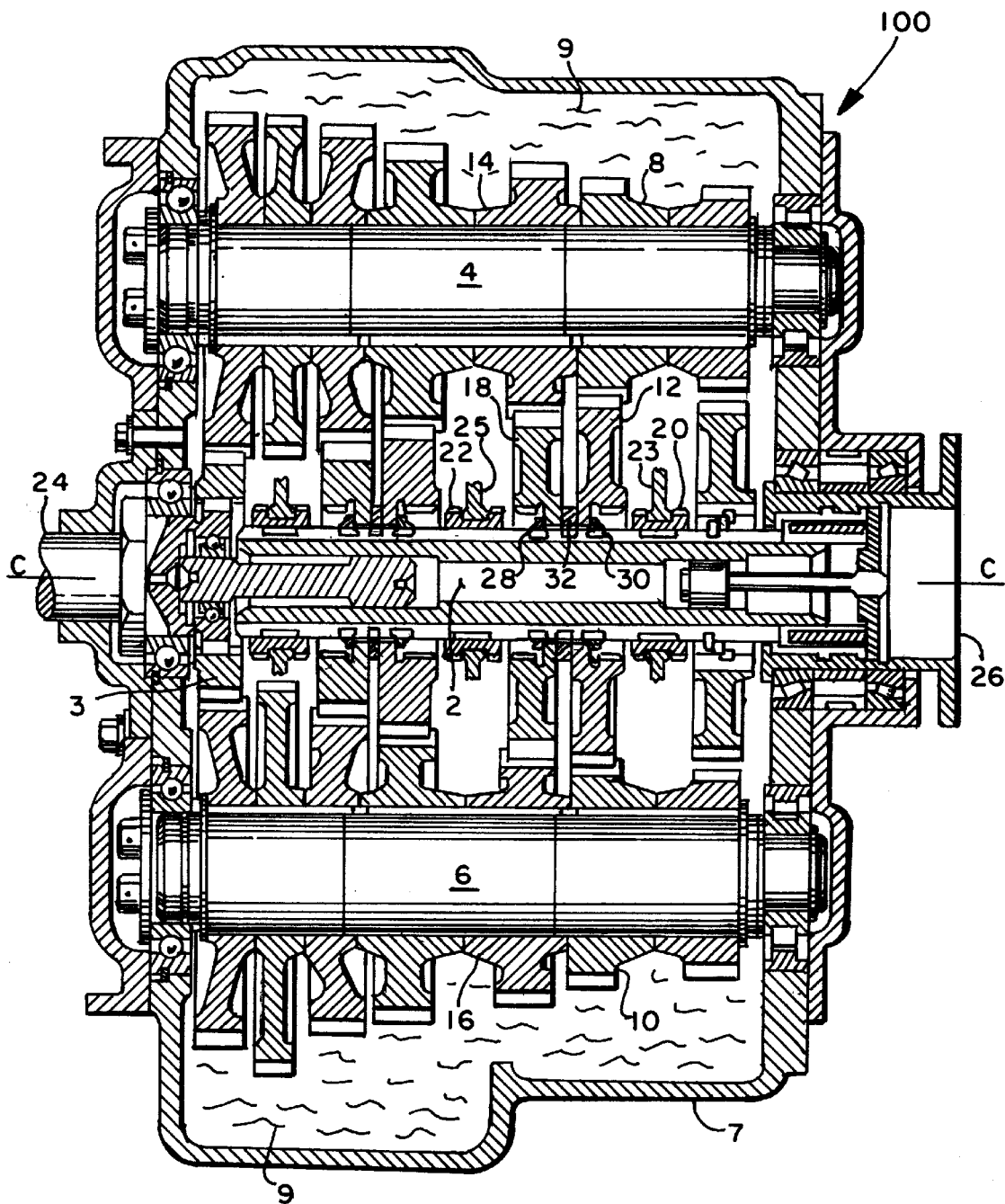
FIG. 1 is a top central cross-sectional view of a vehicular change gear transmission 100 having the improved thrust washer of the invention referenced by numeral 32.

Transmission 100 in FIG. 1 is a vehicular twin countershaft transmission having a pair of countershafts 4 and 6 respectively disposed in parallel spaced relationship on opposite sides of a mainshaft 2. Mainshaft 2 and countershafts 4 and 6 are journaled for rotation on housing 7 of transmission 100.

Housing 7 provides a reservoir for lubricant referenced by numeral 9 that is characteristically distributed throughout the housing by rotation of the various main and countershaft gears.

An input shaft 24 driven by the vehicle's engine rotates gear 3 which in turn drives countershafts 4 and 6 which causes countershaft gears 8 and 10 to rotate mainshaft gear 12 and countershaft gear 12 and countershaft gears 14 and 16 to rotate mainshaft gear 18 about mainshaft 2.

Mainshaft gears 12 and 18 float about mainshaft 2 until selectively clutched thereto by clutch mechanisms 20 and 22 respectively which then causes mainshaft 2 to rotate and drive an output shaft 26 operatively connected to the vehicle's drive wheels such as through a differential assembly.

Mainshaft 2 is rotated at speeds determined by the gear ratio between the particular mainshaft and countershaft gear combination selectively clutched to the mainshaft.

Figure 2:
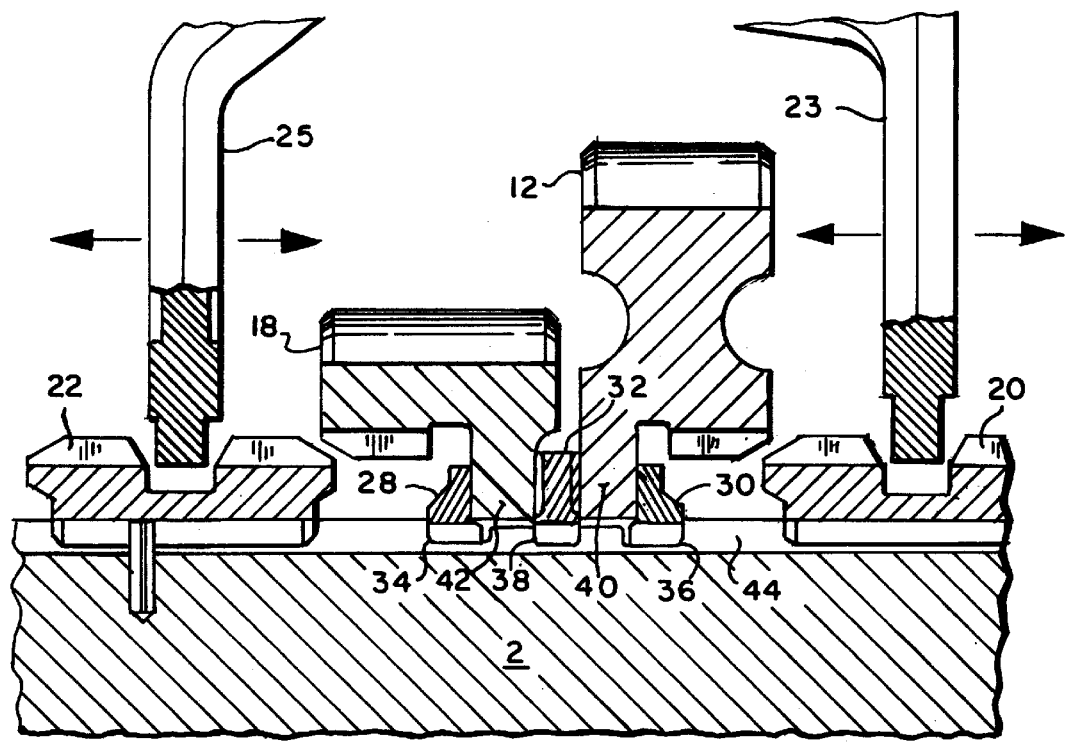
FIG. 2 is an expanded view of the region about thrust washer 32 of FIG. 1.

Clutch assemblies 20 and 22 are spliningly connected to longitudinally extending splines about the outer periphery of mainshaft 2 referenced by numeral 44 in FIG. 2 and thus rotate in unison with mainshaft 2.

Clutch mechanisms 20 and 22 are selectively moveable in opposite axial directions by lever arms 23 and 25 and have teeth that meshingly engage with inner teeth on gears 12 and 18 (not referenced).

In FIG. 2, adjacent mainshaft gears 12 and 18 have respective flanges 40 and 42 that extend radially inwardly towards mainshaft 2. Flanges 40 and 42 have adjacent annular thrust surfaces 47 and 49 that face axially towards each other along mainshaft 2 and respective annular thrust surfaces 54 and 56 on respective opposite sides that face axially away from each other along mainshaft 2 referenced in FIG. 2.

A thrust washer 32 is disposed in transverse groove 38 in the outer surface of mainshaft 2 between the facing annular surfaces 47 and 49 of flanges 40 and 42 of mainshaft gears 12 and 18 respectively.

Figure 3:
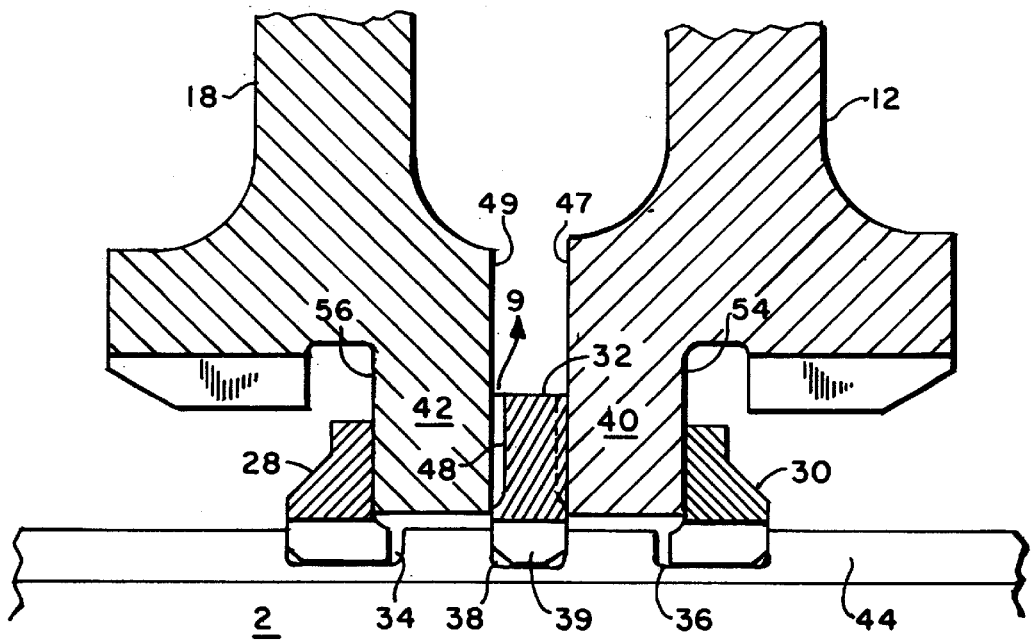
FIG. 3 is an expanded view of the region about thrust washer 32 of FIG. 2.

As shown in FIGS. 2 and 3, retainer rings 28 and 30 are disposed in respective transverse annular grooves 34 and 36 in the outer surface of mainshaft 2 such that retainer ring 30 is adjacent thrust surface 54 of gear 12 and retainer ring 28 is adjacent thrust surface 56 of gear 18.

The arrangement of retainer rings 28 and 30 and thrust washer 32 in grooves 34, 36 and 38 respectively enables axial thrust imparted by clutch assemblies 20 and 22 by movement of lever arm 23 and 25 in opposite axial directions to be absorbed by mainshaft 2.

As shown in FIGS. 3 and 4, thrust washer 32 includes at least one depression on at least one side thereof that enables lubricant 9 to move radially outwardly in the direction of the arrow so as to diminish accumulation of lubricant 9 between thrust washer 32 and the mainshaft gear facing thrust surfaces and thus reduce hydrodynamic drag.

More particularly, as shown in FIGS. 4 and 5, thrust washer 32 is provided with at least one and preferably a plurality of substantially equally circumferentially spaced depressions 48 on one side thereof and more preferably at least one and preferably a plurality of substantially equally circumferentially spaced depressions 58 on the opposite side thereof of which the depressions 58 on one side of thrust washer 32 are positioned circumferentially or indexed between adjacent depressions 48 on the opposite side so as to minimize excessive thinning of the thickness of thrust washer 32 at the particular depression locations.

As in the case for retaining rings 28 and 30, thrust washer 32 is an annular member having an inner and outer periphery. The inner periphery is adapted so that it can be spliningly engaged with axial splines 44 about the outer surface of mainshaft 2. In practice, circumferentially spaced teeth 39 of thrust washer 32 are aligned with the axial grooves between splines 44 after which thrust washer 32 is slid axially along splines 44 and then rotated when positioned in annular groove 38 such that, when one of the grooves between teeth 39 is aligned with one of the grooves between splines 44, a key, such as key 52, is inserted therethrough to secure thrust washer 32 for rotation with mainshaft 2.

By way of example, for a mainshaft having about a 2 9/16 outer diameter, washer 32 is provided with an outer diameter of about 3 inches and an inner diameter of about 2 inches plus an appropriate clearance and a thickness of about 7/16 inches. Thrust washer 32 is preferably provided with six (6) substantially equal circumferentially spaced depressions 48 on one side or more preferably in combination with six (6) indexed depressions 58 on the opposite side thereof as previously described.

The depressions are preferably in the form, flat bottomed wedge shaped shown through as in FIG. 4 that extends radially inwardly for about 5/8 inch with side walls flaring out at about 15° from vertical with the base. The depth of the depression is preferably about 1/4 inch with the edges about the depression tapered outwardly at about 20°.

We claim:

1. A change gear transmission (100) of the type having a mainshaft (2) journaled for rotation about a central rotational axis and having a plurality of splines (44) extending axially along the outer surface thereof in substantially equal spaced relationship to each other, at least two floating mainshaft gears (12, 18) encircling the mainshaft in axially spaced-apart relationship to each other and having respective thrust surfaces (47, 49) facing towards each other in substantial transverse relationship to the mainshaft central rotational axis, clutch means (20, 22) selectively operable to clutchingly engage the mainshaft gears to the mainshaft one at a time, a transverse annular groove (38) disposed in the mainshaft between the mainshaft gear thrust surfaces, and an improved thrust washer (32) disposed in the groove and extending therefrom radially outwardly between the mainshaft gear thrust surfaces and operative to transmit axial thrust to the mainshaft imparted to the mainshaft gears by the clutch means, wherein the improvement is characterized by said thrust washer including a plurality of depressions on opposite sides thereof that are not in registration with each other and are adapted to enable lubricant (9) to move radially outwardly from between the mainshaft gear thrust surfaces and the thrust washer surface so as to diminish accumulation of lubricant therebetween.

2. The transmission of claim 1 wherein the thrust washer is secured for rotation with the mainshaft.

3. The transmission of claim 1 wherein the thrust washer depressions are in substantially equal circumferential spaced relationship to each other on at least one side thereof.

4. An improved thrust washer (32) for transmitting axial thrust to a change gear transmission mainshaft from a floating mainshaft gear being clutchingly engaged therewith, said change gear transmission of the type having a mainshaft (2) journaled for rotation about a central rotational axis and having a plurality of splines (44) extending axially along the outer surface thereof in substantially equally circumferentially spaced relationship to each other, at least two floating mainshaft gears (12, 18) encircling the mainshaft in axially spaced-apart relationship to each other and having respective thrust surfaces (47, 49) facing towards each other in substantial transverse relationship to the mainshaft central rotational axis, clutch means (20, 22) selectively operable to clutchingly engage the mainshaft gears to the mainshaft one at a time, a transverse annular groove (38) disposed in the mainshaft between the mainshaft gear thrust surfaces, said thrust washer (32) disposed in the groove and extending therefrom radially outwardly between the mainshaft gear thrust surfaces and operative to transmit axial thrust to the mainshaft imparted to the mainshaft gears by the clutch means, wherein the improvement is characterized by said thrust washer (32) including a plurality of depressions on opposite sides thereof that are not in registration with each other and are operative to enable lubricant (9) to move radially outwardly from between the mainshaft gear thrust surface and the thrust washer surface so as to diminish accumulation of lubricant therebetween.

5. The thrust washer of claim 4 wherein the depressions are in substantially equal circumferentially spaced relationship to each other on at least one side thereof.

* * * * *